Sept. 2, 1958 R. T. HURLEY 2,850,334
CONNECTING ROD BEARING
Filed Feb. 27, 1953 2 Sheets-Sheet 1
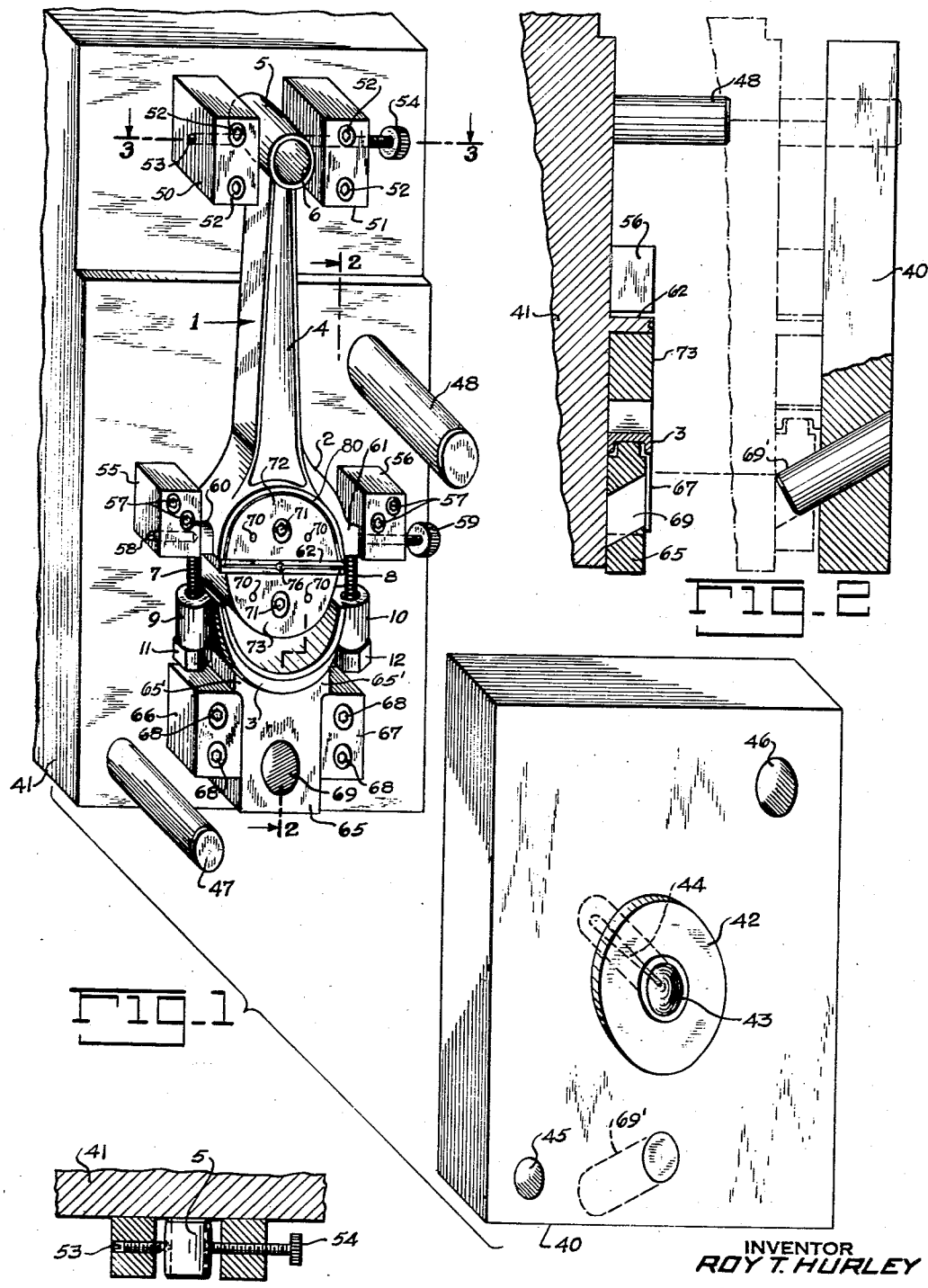
INVENTOR
ROY T. HURLEY
BY
ATTORNEY Sept. 2, 1958  R. T. HURLEY  2,850,334
CONNECTING ROD BEARING
Filed Feb. 27, 1953  2 Sheets-Sheet 2
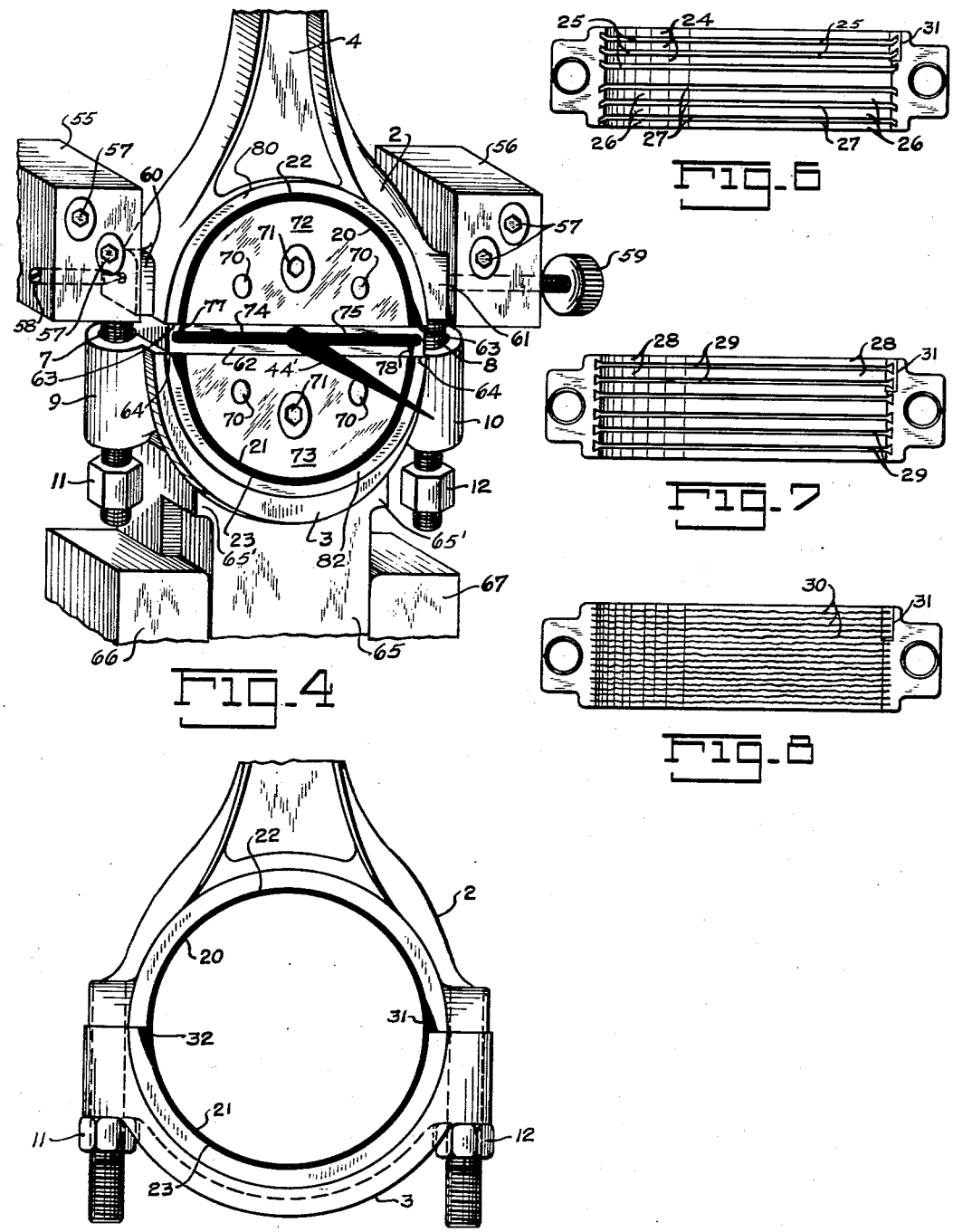
INVENTOR
*ROY T. HURLEY*
BY
ATTORNEY United States Patent Office 2,850,334
Patented Sept. 2, 1958

2,850,334

CONNECTING ROD BEARING

Roy T. Hurley, Westport, Conn., assignor to Curtiss-Wright Corporation, a corporation of Delaware Application February 27, 1953, Serial No. 339,427

1 Claim. (Cl. 308—74)

This invention relates to connecting rod bearings for motor vehicles and the like, and particularly to an integrated connecting rod and bearing structure for coacting with the engine crank shaft, and also to a method of and apparatus for making said integrated structure.

A principal object of the invention is to provide an improved connecting rod bearing having a bearing surface that is composed of a durable plastic material having a very low coefficient of friction integrally bonded and united to the separate halves of the connecting rod.

A further object of the invention is to provide an improved connecting rod bearing of the above character that is durable and efficient in operation, simple and inexpensive in construction, and that can be fabricated by a comparatively small amount of machining on the connecting rod followed by a single plastic molding operation for the bearing surfaces.

A further object of the invention is to provide a novel and improved method of and apparatus for forming a bearing surface of a suitable plastic material by injection molding on and in bonded relation to the inner surface of each of two bearing half-sections of a connecting rod.

Conventional connecting rod bearings require precise machine for the bearing sections, particularly for the inner surfaces thereof to which are carefully fitted "babbitt" bearing strips forming the bearing surface that coacts with the crank shaft. This construction is comparatively expensive, involving material machining time and requires very careful fitting of the connecting rod bearing to the crank shaft as well known in the art.

These disadvantages are overcome to a major extent by the present invention which requires a comparatively small amount of preliminary machining for the bearing sections of the connecting rod (generally formed by drop forging methods or the like) and which, by reason of a precise plastic molding operation, provides durable and resilient bearing surfaces on the sections that can be readily fitted to the crank shaft and operated without the usual time-consuming operation required in fitting "babbitt" bearings.

The invention will be more fully set forth in the following description referring to the accompanying drawings and the features of novelty will be pointed out with particularity in the claims annexed to and forming a part of this specification.

Referring to the drawings:

Fig. 1 is a perspective view showing a connecting rod and apparatus for integrally molding a plastic bearing surface into each of two bearing sections in accordance with the present invention.

Fig. 2 is a vertical offset sectional view taken on the plane of line 2—2 of Fig. 1 and illustrating the manner in which one of the bearing sections is positioned for the molding operation.

Fig. 3 is a horizontal sectional view taken on the plane of line 3—3 of Fig. 1.

Fig. 4 is an enlarged perspective view of the bearing sections on the mold apparatus.

Fig. 5 is an enlarged end view of the bearing sections of the connecting rod apart from the mold apparatus and in an assembled condition.

Fig. 6 is a plan view of one bearing section showing the formation of its inner surface for bonding the plastic bearing material thereto.

Fig. 7 is a plan view of a bearing section having a modified form of inner bonding surface.

Fig. 8 is a plan view of a bearing section having another modified form of inner bonding surface.

In the drawings (Figs. 1 to 5) reference character 1 designates a connecting rod for an internal combustion engine. As shown, the connecting rod includes a pair of bearing sections 2 and 3 at one end of a shank 4 which bearing sections are adapted to connect with an engine crankshaft. Shank 4 has an enlarged portion 5 at its other end which provides a bearing surface 6 to receive a piston pin for connecting the connecting rod to an engine piston. Secured to bearing section 2 are a pair of studs 7 and 8 which extend vertically when the connecting rod is in an upright position as shown in Fig. 1. Studs 7 and 8 extend through projections 9 and 10 on bearing section 3 to connect bearing sections 2 and 3, and have nuts 11 and 12 fitted on ends extending through the projections. Studs 7 and 8 fit loosely in projections 9 and 10 and are of a length such that the bearing sections 2 and 3 can be moved toward or away from one another provided nuts 11 and 12 are located near the ends of the studs and not run up against projections 9 and 10 to tightly assemble the bearing sections as in Fig. 5.

In accordance with my invention, a molded bearing surface of durable plastic material having a very low coefficient of friction and capable of withstanding high temperatures without softening and having satisfactory wearing qualities is formed on and bonded to the inner or backing surface of each of the bearing sections of the connecting rod. A suitable plastic bearing material for this purpose is a synthetic linear condensation polymide generally known as "nylon." Bearing section 2 is provided with such a bearing surface 20 and bearing section 3 with a similar bearing surface 21 (Fig. 4). These bearing surfaces 20 and 21 are molded on the inner surfaces 22 and 23, respectively, of the bearing sections which surfaces may be in an unfinished condition. The molded bearing material will then be maintained in position by reason of the roughness of the inner surface when the connecting rod is in use. Alternatively, however the inner surfaces 22 and 23 may be specially adapted as by machining grooves and the like to hold the bearing layer in bonded relation to its bearing section after its formation thereon. Thus, the inner surfaces of the bearing sections may, for example, be formed with a number of circumferential ridges and grooves as shown in Fig. 6 with certain of the ridges and grooves 24 and 25 disposed at an angle with respect to the other ridges and grooves 26 and 27 in the surface to prevent plastic material which forms in the grooves during a molding operation from pulling out of the grooves and the plastic layer from moving away from the inner surface. Another form of inner surface for the bearing sections includes a plurality of circumferential ridges 28 and a plurality of circumferential grooves 29 which are dovetail in form having a greater dimension at the base of the groove than at the top (Fig. 7). Still another form of surface for the bearing sections adapted to prevent the plastic bearing surface from pulling away from the inner surface includes a number of gouged out rough circumferential grooves 30 such as shown in Fig. 8. In order to prevent the bearing surfaces from sliding circumferentially, bearing section 2 is, in each of the described forms, provided with a beveled groove 31 extending longitudinally of the bearing section for some distance along one edge portion and bearing section 3 is provided with a similar groove 32, these grooves being disposed diametrically opposite each other as shown in Fig. 5.

The apparatus which I have devised for molding the bearing surface of nylon or other plastic material in the connecting rod includes fixed and movable tables 40 and 41, respectively, of an injection molding machine. Fixed table 40 is provided with a fitting 42 which is recessed at 43 to receive an injection nozzle and includes a sprue opening 44 communicating with recess 43 to transmit molten plastic. Fixed table 40 includes openings 45 and 46 in diagonally opposite corners for receiving cylindrical guide posts 47 and 48, respectively, secured to movable table 41. It is intended that table 41 be operated between an open position such as shown in Fig. 1 and a closed molding position as shown in Fig. 2 (in broken outline).

Means are provided for securing bearing section 2 on movable table 41 and include a pair of spaced metal blocks 50 and 51 secured as by bolts 52 to the table at one end. Block 50 is provided with a fixed pin 53 to engage a recess defining a locator point in the surface of enlarged end portion 5 of the connecting rod and block 51 has a thumb screw 54 which is aligned with pin 53 and extends through the block to engage another recess defining another locator point in the surface of end portion 5 when suitably positioned by turning, for holding end portion 5 of the connecting rod in a fixed position on movable table 41. Another pair of blocks 55 and 56 secured to table 41 by bolts 57 and including aligned fixed pin 58 and thumb screw 59 to engage recesses defining locator points in projecting portions 60 and 61 respectively on bearing section 2 are also provided to fix the position of bearing section 2 on table 41. Table 41 is formed with an integral separating wall 62 which is disposed to extend between bearing sections 2 and 3 in a separated condition and in pressure tight contact with the longitudinal edges 63 of one bearing section, namely bearing section 2. The conical positioning pins for the bearing section 2 are adapted to hold this section in pressure-tight fit against the separating wall 62.

Means are also provided for actuating the other bearing section 3 to a position with its longitudinal edges 64 in pressure-tight contact with wall 62 as the table 41 is moved from its open to its closed position for the injection operation. As shown, a locating block 65 is provided to engage the lower edge of the bearing section 3 which block is slidably mounted on table 41 between spaced guide blocks 66 and 67 secured on the table by bolts 68. Block 65 assumes a position with its flanged end portions 65' in contact with fixed blocks 66 and 67 in the open position of table 41, but is provided with an angular opening 69 to receive an angularly disposed cylindrical peg 69' on the fixed table 40 for actuating the block by cam action and positioning the bearing section 3 tightly against wall 62 as the table 41 is moved to its closed molding position (Figs. 1 and 2).

Positioned over dowel pins 70 on table 41 and secured to the table by bolts 71 are a pair of semicylindrical sections 72 and 73 which together with separating wall 62 constitute in effect an integral central mold structure permitting the formation of a plastic bearing surface in each of sections 2 and 3. As shown, the semicylindrical sections 72 and 73 make pressure-tight contact with opposite faces of the wall 62. With the connecting rod positioned and secured on table 41, the inner surface 22 is suitably spaced from semicylindrical section 72 to permit the formation of a bearing surface of requisite thickness between them. Inner surface 21 of bearing section 3 is spaced a generally like amount from the semicylindrical section 73 in the closed molding position of table 41 to permit the formation of a suitable bearing surface between these parts.

As shown, the separating wall 62 includes at its outer edge longitudinal grooves 74 and 75, which grooves connect with a central recess 76 that in turn communicates with the sprue opening 44 in the closed molding position of table 41. Groove 74 connects through gate 77 with the space between inner surface 22 of bearing section 22 and semicylindrical section 72, whereas groove 75 connects through gate 78 with the space between inner wall 23 of bearing section 3 and semicylindrical section 73.

It will therefore be seen by reason of the fixed positioning pins for the bearing section 2 and the slidable block 65 for the bearing section 3, together with the fixed central mold structure including the semicylindrical sections 72 and 73 and the separating wall 62, that the inner bearing surface is formed in predetermined relation to the fixed locating points of the connecting rod, regardless of slight variations in the dimensions of the inner surfaces of the bearing sections 2 and 3. Of necessity, the inner plastic bearing surface is always formed concentrically of the center of the fixed central mold structure comprising the parts 62, 72 and 73.

It is intended that in effecting a molding operation the table 41 will be suitably operated from an open position such as shown in Fig. 1 to a closed molding position as shown in Fig. 2 (in broken outline), in which closed position the end edge 80 and the corresponding edge on the opposite side of bearing section 2, and the end edge 82 and the corresponding edge on the opposite side of bearing section 3 are tightly sealed by the opposing surfaces of tables 40 and 41, and the bearing section 3 is so located that its longitudinal edges are in pressure tight contact with separating wall 62, bearing section 3 having been moved to such location by the slidable block 65. As shown by Fig. 2, the outer surfaces (right, as viewed) of the separating wall 62, the semicylindrical sections 72 and 73 and the end edges of the bearing section 3 (and also the bearing section 2) are all flush so as to make simultaneous flush contact with the flat side of the fixed mold table 40. The slidable block 65 is of course somewhat under-cut to prevent binding thereof by the fixed table.

In the closed and sealed molding position of table 41 molten plastic is injected under pressure through the sprue opening 44 in fitting 42 and passages provided by the grooves 74 and 75 in the integral wall 62 and thence through gates 77 and 78 to the respective spaces between the semicylindrical sections 72 and 73 and the inner surfaces of bearing sections 2 and 3. When the plastic has cooled the movable table 41 may be withdrawn after which the connecting rod can be removed from the table and the material 44' formed in the sprue removed along with any flash material. The connecting rod is now provided with accurately formed bearing surfaces requiring no further working before use, and which are adapted to operate satisfactorily under severe operating conditions.

It should be understood that this invention is not limited to specific details of construction and arrangement thereof herein illustrated, and that changes and modifications may occur to one skilled in the art without departing from the spirit of the invention.

What is claimed is:

A connecting rod comprising a pair of detachably connected bearing half-sections, one of said sections being integral with the rod and having thereon locator points, each section having an unfinished backing surface to which is molded a nylon liner the axis of which is located with respect to said locator points independently of said backing surface, said nylon liner constituting a thin strip integrally bonded to said backing surface and forming a bearing surface which in the connected position of said bearing sections forms with the complementary strip a circular bearing surface that is accurately centered in relation to the said locator points of the connecting rod thereby compensating for variations and inequalities in said backing surfaces.

References Cited in the file of this patent

UNITED STATES PATENTS

| | | | |
|---|---|---|---|
| 1,126,888 | Seaman | Feb. 2, | 1915 |
| 1,460,515 | Selker | July 3, | 1923 |
| 1,692,340 | Lattin | Nov. 20, | 1928 |
| 1,939,467 | Short et al. | Dec. 12, | 1933 |
| 1,948,176 | Hopkins et al. | Feb. 20, | 1934 |
| 1,977,335 | Brophy et al. | Oct. 16, | 1934 |
| 2,239,834 | Williams | Apr. 29, | 1941 |
| 2,446,090 | Holloway | July 27, | 1948 |
| 2,459,598 | Stott | Jan. 18, | 1949 |
| 2,559,860 | Fay | July 10, | 1951 |
| 2,604,660 | Karns | July 29, | 1952 |
| 2,776,175 | Waite | Jan. 1, | 1957 |